July 5, 1927.
P. TROSKI
BIRD HOUSE
Filed Nov. 26, 1926
1,634,763
3 Sheets-Sheet 1
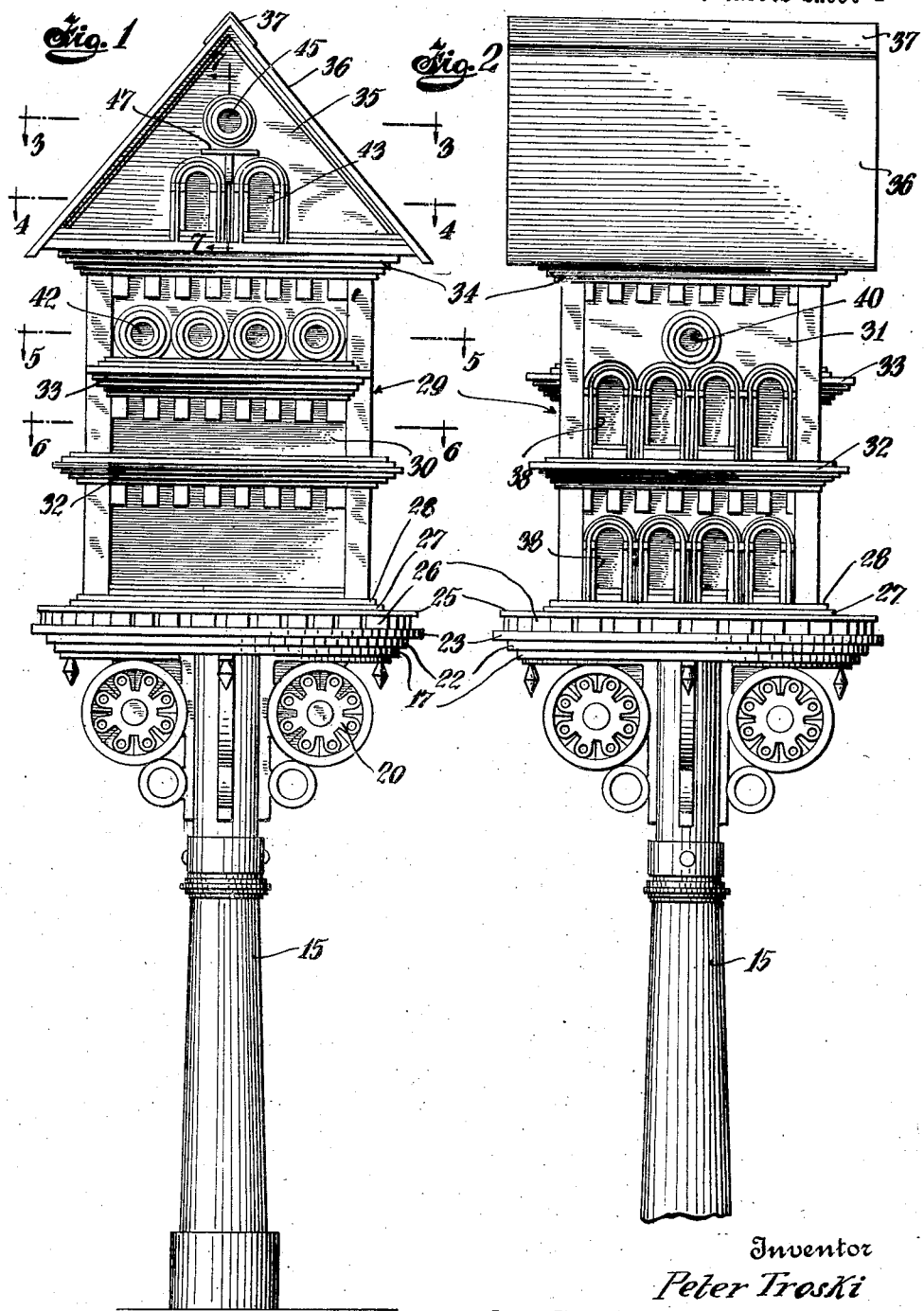
Inventor
Peter Troski
By his Attorney July 5, 1927.  P. TROSKI  1,634,763
BIRD HOUSE
Filed Nov. 26, 1926   3 Sheets-Sheet 2
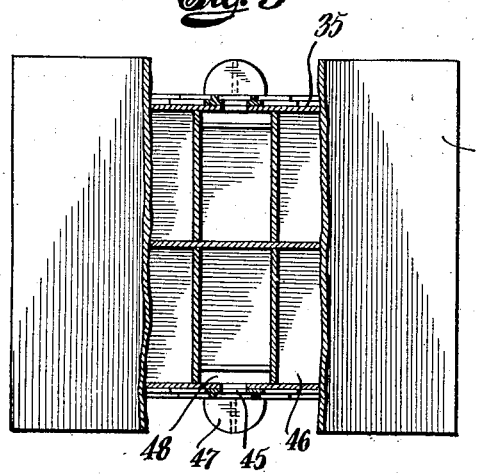
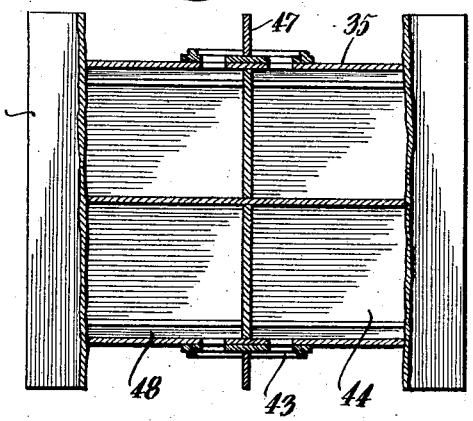
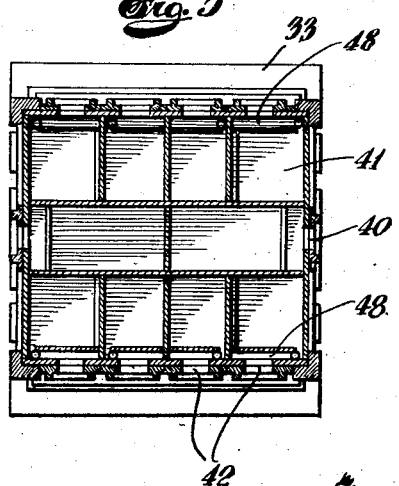
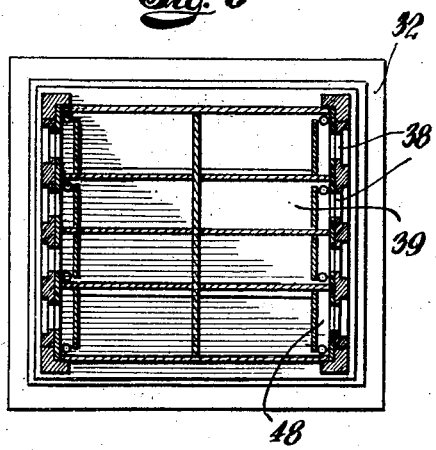
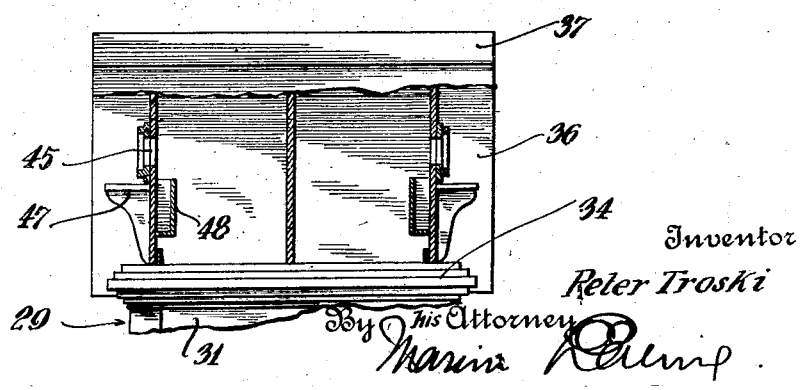
Inventor
Peter Troski July 5, 1927.
P. TROSKI
BIRD HOUSE
Filed Nov. 26, 1926
1,634,763
3 Sheets-Sheet 3
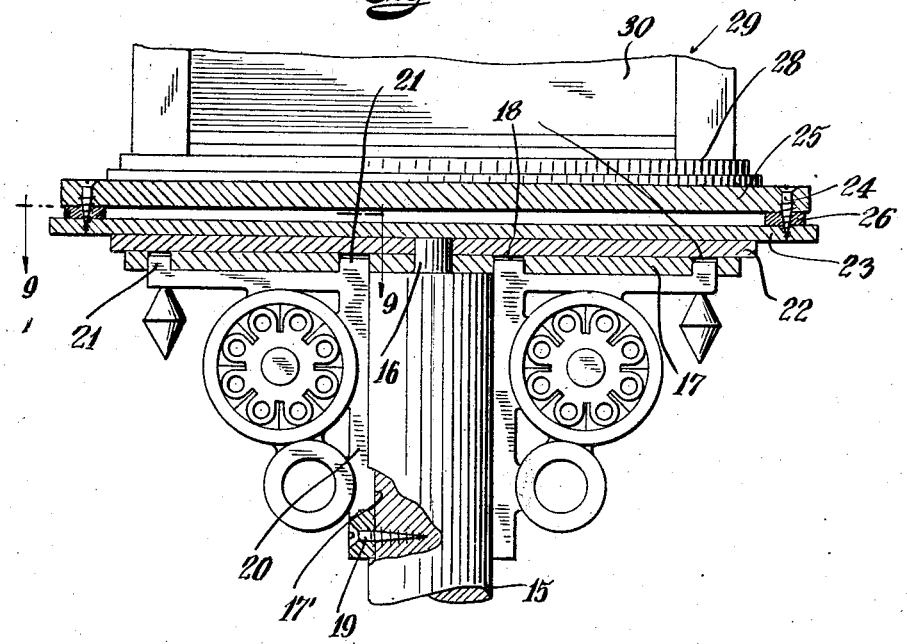
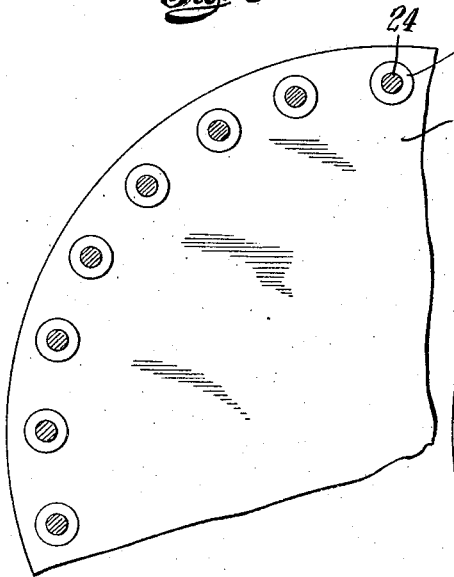
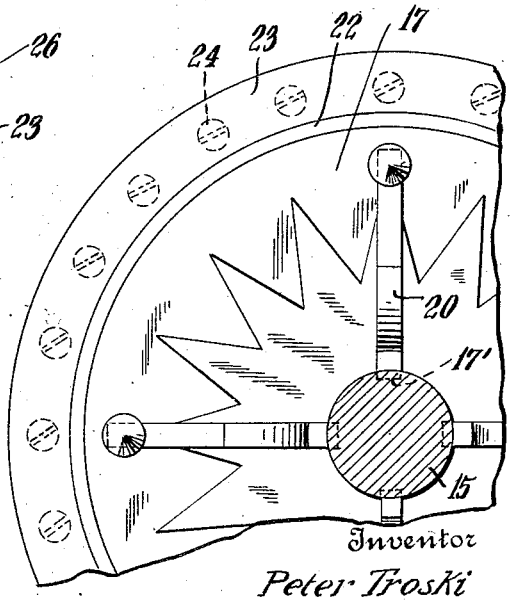
Inventor
Peter Troski
By his Attorney Patented July 5, 1927.

1,634,763

UNITED STATES PATENT OFFICE.

PETER TROSKI, OF ARISTA, WEST VIRGINIA.

BIRD HOUSE.

Application filed November 26, 1926. Serial No. 150,641.

This invention relates to houses or nests and more particularly to such places of shelter as inhabited by birds.

One of the objects of this invention is to provide a bird house containing a multiplicity of rooms or compartments capable of accommodating a fairly large flock of birds.

Another aim is in the provision of a bird nest having a plurality of entrances, one for each room, none of the rooms being in communication with each other.

A further characteristic is to provide individual feeding compartments for each room, assuring each "tenant" of his proper food.

These and other objects will become apparent as the description progresses, the same being made possible by the novel construction, combination and arrangement of parts, hereinafter described and illustrated in the accompanying drawing, forming an important component of this disclosure, and in which:—

Figure 1 is a front elevational view of a bird house made in accordance with the invention.

Figure 2 is a side elevational view of the same.

Figure 3 is a transverse sectional view taken on line 3—3 of Figure 1.

Figure 4 is a similar view taken on line 4—4 of Figure 1.

Figure 5 is a like view taken on line 5—5 of Figure 1.

Figure 6 is a similar illustration taken on line 6—6 of Figure 1.

Figure 7 is a longitudinal sectional view taken on line 7—7 of Figure 1.

Figure 8 is a fragmentary partial transverse sectional view of the support, drawn to an enlarged scale.

Figure 9 is an enlarged fragmentary plan view looking on line 9—9 of Figure 8.

Figure 10 is a similar bottom plan view of the house support, partially in section.

In the drawing, the numeral 15 designates a circular pole rising from any level surface having a reduced end 16 on which is mounted a disc 17 having concentric grooves 18 in its undersurface.

Secured to the pole in recesses 17' by screws 19 are four brackets 20, arranged at right angles to each other, having projections 21 on their upper surfaces engaging the grooves 18.

Fixed on the disc 17 is another larger disc 22, also engaging the reduced end 16 of the pole, on which is secured a still larger disc 23, to which is fixed by screws 24, a square plate 25, there being a plurality of spacers 26 interposed between the discs 23 and 25 through which the screws 24 pass.

Fixed on the square plate 25 are two smaller plates 27 and 28, the latter constituting the ground floor of the house.

The house consists of a rectangular frame 29 having similar front and rear walls 30 and similar side walls 31.

Surrounding the frame 29, one-third from the bottom floor 28 is a moulding 32 constituting a platform.

Fixed on the front and rear walls 30 two-thirds from the floor 28 is a moulding or platform 33, the top of the frame being surrounded by a moulding 34 similar to the platform 32.

The front and rear walls 35 of the attic of the house support a V-shaped roof 36 having a reenforcing bracket 37 along the apex thereof.

The side walls of the house are provided with a plurality of bullet-like openings 38 leading to the first floor 28 and a second floor 39 on a level with the platform 32, there being a circular opening 40 leading to a third floor 41 on a level with the platform 33.

The front and rear walls 30 are provided with circular openings 42 leading to the floor 41, while the attic contains bullet like openings 43 leading to a fourth floor 44 on a level with the platform 34 and a circular opening 45 leading to a fifth floor 46 on a level with a platform 47 fixed on the wall 35 above the openings 43.

Each of the floors 28, 39, 41, 44 and 46 are divided into compartments, the plans of which may be readily understood by reference to Sheet 2 of the drawings and each compartment is provided with a feed box 48.

Thus it may be seen that a house has been disclosed adapted to shelter quite a large flock of birds, each bird being individually quartered and fed.

Although the foregoing is descriptive of the preferred form of my invention, it is to be understood that changes in construction and details thereof may be made without departing from the scope of the appended claim.

Having thus described my invention, what I claim as new and desire to secure by Letters Patent, is:—

A bird house comprising a pole, brackets on said pole, discs on said pole and brackets, a rectangular frame on said discs, a V-shaped roof on said frame, floors in said frame, compartments on said floors, said compartments being enterable through openings in said frame, and feed boxes in each of said compartments.

In witness whereof I have affixed my signature.

PETER TROSKI.